United States Patent
Bouda

(10) Patent No.: US 10,771,152 B2
(45) Date of Patent: Sep. 8, 2020

(54) SYSTEM AND METHOD FOR OPTICAL SYSTEM MARGIN ALLOCATION

(71) Applicant: Fujitsu Limited, Kawasaki-shi, Kanagawa (JP)

(72) Inventor: Martin Bouda, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/505,206

(22) Filed: Jul. 8, 2019

(65) Prior Publication Data

US 2020/0136723 A1 Apr. 30, 2020

Related U.S. Application Data

(60) Provisional application No. 62/753,317, filed on Oct. 31, 2018.

(51) Int. Cl.
| | |
|---|---|
| *H04B 10/08* | (2006.01) |
| *H04B 10/079* | (2013.01) |
| *H04J 14/02* | (2006.01) |
| *G06N 3/08* | (2006.01) |
| *H04B 10/27* | (2013.01) |
| *H04L 1/00* | (2006.01) |

(52) U.S. Cl.
CPC ......... *H04B 10/07953* (2013.01); *G06N 3/08* (2013.01); *H04B 10/27* (2013.01); *H04J 14/021* (2013.01); *H04J 14/0241* (2013.01); *H04L 1/0061* (2013.01)

(58) Field of Classification Search
CPC ......... H04B 10/0793; H04B 10/07953; H04B 10/0795; H04B 10/0775; H04B 10/0773; H04B 10/07955; H04J 14/0227; H04Q 11/0066

USPC ........ 398/25, 26, 27, 33, 34, 38, 37, 79, 83, 398/158, 159, 45, 48, 49
See application file for complete search history.

(56) References Cited

U.S. PATENT DOCUMENTS

2017/0310392 A1* 10/2017 Boertjes .......... H04B 10/07953
2018/0367214 A1* 12/2018 Woodward ............ H04Q 11/00

OTHER PUBLICATIONS

Oda, Shoichiro, et al. "Demonstration of an autonomous, software controlled living optical network that eliminates the need for pre-planning." *Optical Fiber Communication Conference*. Optical Society of America, 2016; 3 pages.

(Continued)

*Primary Examiner* — Hanh Phan
(74) *Attorney, Agent, or Firm* — Baker Botts L.L.P.

(57) ABSTRACT

A system and method for generating, based on optical network topology information, an optical model to represent an optical network; provisioning a new optical connection within the optical network: determining, using the optical model, a first bit error rate (BER) of the new optical connection; determining, using the optical network providing the new optical connection, a second BER of the new optical connection; determining, based on the first and the second BER, a BER excursion parameter of the new optical connection; training a margin allocator based on the BER excursion parameter of the new optical connection, and the first BER of the new optical connection; comparing the first BER of the new connection and a required optical margin to a threshold to determine a reliability of the new optical connection; and allocating, using the margin allocator, the required optical margin for additional optical connections of the optical network.

20 Claims, 4 Drawing Sheets

(56) References Cited

OTHER PUBLICATIONS

Bouda, Martin, et al. "Demonstration of Continuous Improvement in Open Optical Network Design by QoT Prediction using Machine Learning." *Optical Fiber Communication Conference.* Opfical Society of America, 2019; 3 pages.

Ronda, Martin, et al. "Accurate prediction of quality of transmission based on a dynamically configurable optical impairment model." *Journal of Optical Communications and Networking* 10.1 (2018): A102-A109; 9 pages.

Oda, Shoichiro, et al. "Network capacity improvement by quality of transmission estimator with learning process." *2017 European Conference on Optical Communication (ECOC).* IEEE, 2017; 3 pages.

Bouda, Martin, et al. "Accurate prediction of quality of transmission with dynamically configurable optical impairment model." *2017 Optical Fiber Communications Conference and Exhibition (OFC).* IEEE, 2017; 3 pages.

Oda, Shoichiro, et al. "Innovative Optical Networking by Optical Performance Monitoring and Learning Process." *2018 European Conference on Optical Communication (ECOC).* IEEE, 2018; 3 pages.

Bouda, Martin, et al. "Holistic Optical Network Optimization across Network and Physical Layers," *Photonics in Switching.* Optical Society of America, 2017; 3 pages.

\* cited by examiner

SYSTEM AND METHOD FOR OPTICAL SYSTEM MARGIN ALLOCATION

CROSS-REFERENCE TO RELATED APPLICATIONS

This application claims the benefit of U.S. Prov. Ser. No. 62/753,317 filed on Oct. 31, 2018, the disclosure of which is expressly incorporated herein by reference in its entirety.

FIELD OF THE DISCLOSURE

The present disclosure relates generally to optical communication networks and, more particularly, to systems and methods for optical system margin allocation.

DESCRIPTION OF THE RELATED ART

Telecommunications systems, cable television systems and data communication networks use optical networks to rapidly convey large amounts of information between remote points. In an optical network, information is conveyed in the form of optical signals through optical fibers. Optical networks may also include various optical nodes which may contain various components such as amplifiers, dispersion compensators, multiplexer/demultiplexer filters, wavelength selective switches, couplers, etc. to perform various operations within the network.

Optical network virtualizations enable network service providers to provision multiple coexisting and isolated virtual optical networks (VONs) over the same physical infrastructure. For example, in conventional optical networks, network services are provided in terms of lightpaths (i.e., optical network paths between given endpoints). When provisioning VONs in response to a request, different mapping patterns for mapping a virtual node to physical topology may be possible.

In optical networks, for reliable optical transmission over time, the manual creation of optical signal transmission system design rules specifies each particular optical connection hardware configuration and operation condition. However, design rule creation can be expensive and difficult. Additionally, information about the optical network can be unknown or unreliable. Even for non-$3^{rd}$ party proprietary networks, obtaining the desired information may be too time-consuming, or too expensive to obtain in advance before deployment. Conventional custom design depends on the availability of reliable information. For example, performing simulation studies to obtain reliable information can itself be unreliable, manual, and costly; and performing field and lab measurements can be limited or impossible access and costly.

SUMMARY

Innovative aspects of the subject matter described in this specification may be embodied in a method for obtaining optical network topology information of an optical network; generating, based on the optical network topology information, an optical model to represent the optical network; provisioning a new optical connection within the optical network: in response to provisioning the new optical connection: determining, using the optical model, a first bit error rate (BER) of the new optical connection of the optical network; determining, using the optical network providing the new optical connection, a second BER of the new optical connection; determining, based on the first BER and the second BER, a BER excursion parameter of the new optical connection; training a margin allocator comprising a recurrent neural network (RNN) based on the BER excursion parameter of the new optical connection, and the first BER of the new optical connection; comparing the first BER of the new connection and a required optical margin to a threshold to determine a reliability of the new optical connection; and allocating, using the margin allocator, the required optical margin for additional optical connections of the optical network.

Other embodiments of these aspects include corresponding systems and apparatus. These and other embodiments may each optionally include one or more of the following features. For instance, updating one or more parameters of the optical model based on the new optical connection and the second BER of the new optical connection. Updating each optical model block of the optical model based on a wavelength, a spectral width, and a power level of the new optical connection. The threshold is a forward error correction (FEC) error correction limit. Obtaining the optical network topology information of the optical network includes obtaining topology information of one or more reconfigurable optical add-drop multiplexers (ROADMs) of the optical network and optical connections between the ROADMs of the optical network. Determining a reachability of the new optical connection based on the signal quality of the new optical connection and the optical margin of the new optical connection. Identifying a largest BER deviation within a time period shorter than a time period of an averaged BER. Identifying a largest SNR deviation within a time period shorter than a transmission frame from a predicted SNR value obtained using an optical model with associated parameters that are adjusted substantially less frequently than the time period. Determining a BER of an existing optical connection of the optical network; determining, by the optical model, a signal quality of the existing optical connection; determining, based on the BER of the existing optical connection, a BER excursion parameter of the existing optical connection; and training the margin allocator RNN based on the BER excursion parameter of the existing connection and the signal quality of the existing connection. Updating or more parameters of the optical model based on the BER of the existing optical connection. Identifying a signal-to-noise ratio (SNR) of at least one other optical connection of the optical network; determining a signal quality metric using the optical model and one or more parameters of the optical model that are based on the SNR of the at least one other optical connection of the optical network; and replacing the first BER with the determined signal quality metric. The BER excursion parameter of the new optical connection is based on the determined signal quality metric over a time window that is substantially greater than a window used to determine the second BER.

Particular implementations of the subject matter described in this specification can be implemented so as to realize one or more of the following advantages. For example, a correct amount of optical system margin can be predicted that is needed to maintain an optical connection operating reliably assuming minimal knowledge of the network topology and routes of the optical signals in the network. The computed required amount of optical margin can be compared to the available optical margin which can be obtained by comparing BER calculated using the optical model to a threshold such as the FEC threshold. Subsequently the comparison can be used to determine the configuration and operating parameters of the new optical connection, such as modulation format, FEC code, launch power in all links, fiber spans or individually for each span, or to determine a more cost-efficient optical route and wavelength. The configuration and operating parameter setpoint decision can be made for already deployed optical connections to improve efficiency, or for yet to be deployed optical connections to optimally plan and deploy future optical connections. The ability to make performance predictions avoids costly and time-consuming, or potentially disruptive tentative deployment of hardware for the purpose of probing the channel. Further, the claimed method allows determination of channel performance over extended periods of time, in contrast to probing for which time is limited and which results in merely a one-time performance snapshot which might deviate significantly from longer-term performance and make it hard to allocate a suitable optical system margin. A suitable margin is a balance between the risk to prove insufficient resulting in costly information transmission interruption and failure, and being excessive and as a result wasteful of costly optical hardware resources in the network such as optical transponders, or spectrum of optical fiber.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

This document describes a system and a method for enabling the design of reliable connections in an optical network that adapts to the amount of available information of the optical network based on a direct measurement of a bit error rate (BER) of connections of the optical network. Specifically, this document discusses a hybrid of physical optical model and artificial neural network (ANN) model to predict a signal quality or BER and a required optical margin to ensure a reliability of an optical environment (e.g., an optical connection transporting information over a network or an optical information transport network). The hybrid allows separation between on one side the estimation of a typical signal quality based on relatively simple and well-understood optical model, and the estimation of model parameters using relatively stable and reliable information sources; and on the other side the estimation of the level of signal quality deviation relative to the typical signal quality estimate, based on information sources that provide higher order statistics, which needs longer periods of time to collect, and of which the individual causes may be hard to determine and separate, and for which a hard to design catch-all model is needed to capture the remaining characteristics that cannot be captured using the optical model. An advantage of adapting a model based on bit-error rate (BER) measurement rather than based on measurement of the multitude of model parameters is that achieving zero prediction error of BER is easier to achieve and with less data. The BER is the characteristic that is most closely related to reliability. BER measurement is readily available in any transponder. Other characteristics available in optical transponders that area closely related to the BER, such as Q, signal-to-noise ratio (SNR), or analog waveform characteristics could similarly be used to realize the benefits of this invention, however, the BER captures all optical signal degradations in the system most completely. An advantage of adapting an ANN to the amount of measurement data needed is important because the number of deployed optical connections may be small. An advantage of the hybrid is a significant reduction of the amount of BER measurements needed to achieve high stability and high accuracy of predictions of typical BER, which is of primary importance, and allowing of more time to achieve stable and high accuracy prediction of higher-order statistical properties, which is of secondary importance. Both predictions are important to determine efficient operating conditions of an optical connection and an optical network In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
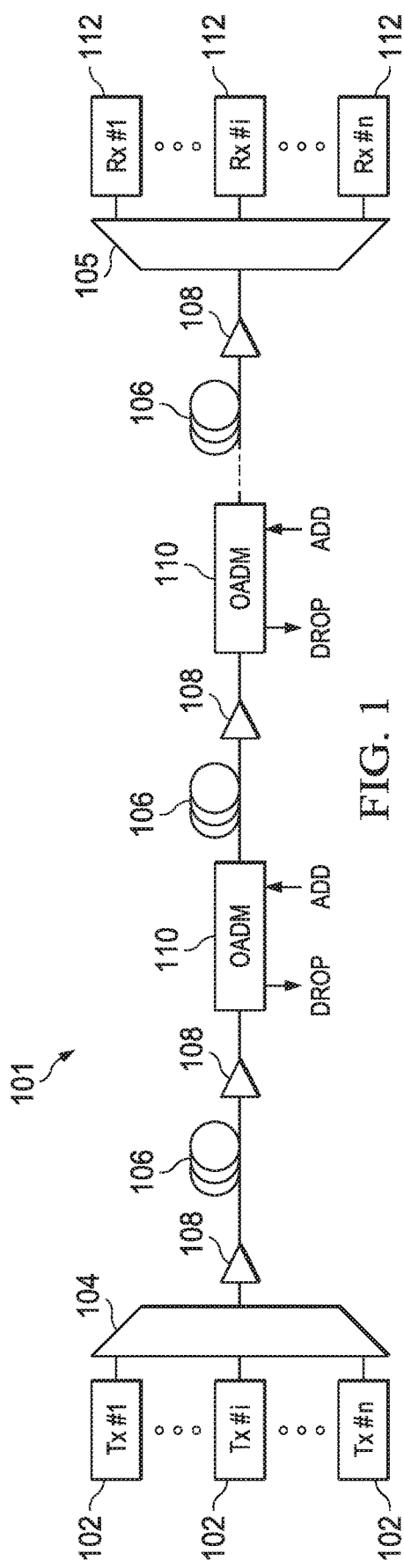
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 b/s or greater. In particular embodiments, Nyquist wavelength-division multiplexing (N-WDM) may be used in a superchannel. In N-WDM, optical signals having a nearly rectangular spectrum are packed together in the frequency domain with a bandwidth approaching the baud rate. Application of Nyquist shaping is not limited to superchannels, but is also used to transmit over narrower optical channels to increase the total number of channels within a spectral range of an optical amplifier.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation. A cascade of two types of FECs can be used in place of a single FEC of one type to achieve better performance.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a Raman amplifier, or a semiconductor optical amplifier (SOA), may be used.

Optical add/drop multiplexers (OADMs) 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM. ROADMs may also route incoming optical signals from the network to one of multiple network outputs without dropping the signal.

Many existing optical networks are operated at 10 gigabit-per-second (Gbps) 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond (e.g., 100 Gbps, 200 Gbps, or 400 Gbps), the wider spectrum requirements of such higher data rate signals often require increasing channel spacing (e.g., 50 GHz or 75 GHz). In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS). ROADMs may be able to select from a composite WDM signal of n channels one or more channels and direct these to a specific transponder, and removing the selected signal from the composite WDM signal. Similarly a ROADMs may be able to combine a signal from a transponder with an incoming composite WDM signal.

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a ninety (90) channel DWDM signal. Demultiplexer 105 may divide the single, ninety channel DWDM signal into ninety separate signals according to the ninety different channels. It will be understood that different numbers of channels or subcarriers may be transmitted and demultiplexed in optical transport network 101, in various embodiments. OADM add and drop ports may be coupled to a multiplexer and demultiplexer respectively.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant. Hybrid modulation techniques alternate above constellations in subsequent symbols, and constellation shaping techniques controls how many bits per second are carried over each constellation point to achieve optical transmission closer to the Shannon limit.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 2) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, higher-order modulation formats, such as 16-QAM or 64-QAM, may be used to increase transmission capacity per unit wavelength channel width. Higher-order modulation formats may be applied using transmitter 102 and receiver 112. However, the use of higher-order modulation formats may result in decreased transmission reach (also referred to simply as 'reach') of the optical signal. For example, the reach may be determined by an acceptable value for bit rate error (BER), and accordingly optical signal-to-noise ratio (OSNR), which may be observed at receivers 112.

One strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, the use of superchannels might not extend the transmission reach of optical signals using optical transport network 101.

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

Figure 2:
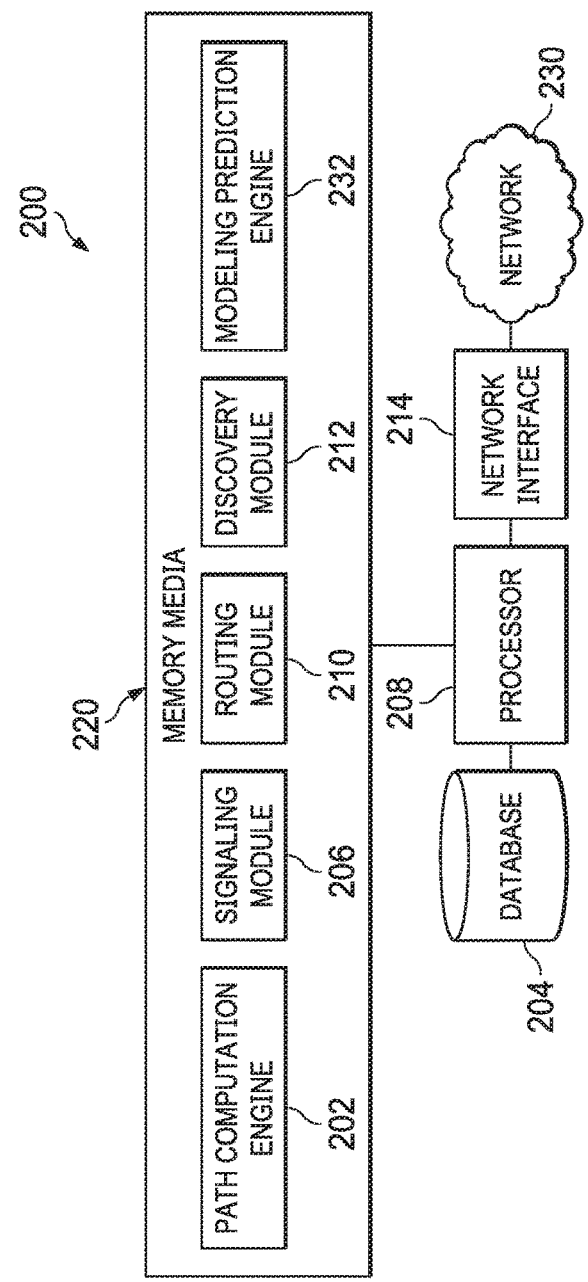
FIG. 2 is a block diagram of selected elements of an embodiment of a network management system for implementing control plane functionality in optical networks.

Referring now to FIG. 2, a block diagram of selected elements of an embodiment of network management system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, network management system 200 includes processor 208 and memory media 220, which may store executable instructions (i.e., executable code) that may be executable by processor 208, which has access to memory media 220. Processor 208 may execute instructions that cause network management system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

Also shown included with network management system 200 in FIG. 2 is network interface 214, which may be a suitable system, apparatus, or device operable to serve as an interface between processor 208 and network 230. Network interface 214 may enable network management system 200 to communicate over network 230 using a suitable transmission protocol or standard. In some embodiments, network interface 214 may be communicatively coupled via network 230 to a network storage resource. In some embodiments, network 230 represents at least certain portions of optical transport network 101. In certain embodiments, network 230 may include at least certain portions of a public network, such as the Internet. Network 230 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 2), for example via network 230.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network. The routing module may operate an optical model, an optical margin allocator, and predict optical reachability and reliability for existing or non-existing optical signal transmission paths and for different transmitter and receiver configurations. The optical model and margin allocator may be adaptively incorporating information based on field measurement, and network control information such as routing of optical signals present in the network, or optical network hardware configuration.

Path computation engine 202 may be configured to use the information provided by routing module 210 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In some embodiments, database 204 may be populated with information indicating a respective reach (and/or an achievable reach extension) and a respective spectral efficiency for WDM channels at particular wavelengths and with particular combinations of modulation formats, symbol rates, and numbers of subcarriers, with and without probabilistic constellation shaping of particular types. In some embodiments, network management system 200 may be configured to determine, based on the information in the database, particular combinations of these parameters that can result in a given shorter wavelength channel achieving a target reach selected for all WDM channels in an optical transport network.

In FIG. 2, signaling module 206 may provide functionality associated with setting up, modifying, and tearing down end-to-end networks services in optical transport network 101. For example, when an ingress node in the optical network receives a service request, the control plane may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation of network management system 200, after an optical channel has been provisioned, network management system 200 may configure the optical channel to increase the transmission reach of the optical channel. In some embodiments, path computation engine 202, or another element of network management system 200, may be operable to select, within the optical transmission system, a specific modulation format and a specific number of subcarriers to achieve the highest spectral efficiency and the longest reach for the optical channel, or select a desirable trade-off point between reach and spectral efficiency.

In operation of network management system 200, path computation engine 202, or another entity or module, may provide path information associated with a given optical path, such as a distance, a number and type of optical channels to be transmitted, a fiber type, and a dispersion map. For example, signaling module 206, or another entity or module, may receive the path information and may decide on a type of modulation format and whether or not to use constellation shaping for any of the optical channels transmitted over the optical path. In order to activate or deactivate constellation shaping, signaling module 206 may send a first command to each transmitter for each of the optical channels, respectively. Then, signaling module 206 may send a second command to each receiver corresponding to each transmitter to activate or deactivate constellation shaping. Transmitters and receivers having universal programmable transponder functionality may receive the commands from signaling module 206 and may then activate or deactivate transmission of the optical channels using constellation shaping. Signaling module 206 may collect measurement data reported by optical network hardware. For example, optical transponders may periodically report 15-minute interval averaged BER corresponding to a received optical signal.

The network management system 200 can further include modeling prediction engine 232 that can identify an amount of optical system margin needed to maintain an optical connection operating reliably, described further herein.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

Figure 3:
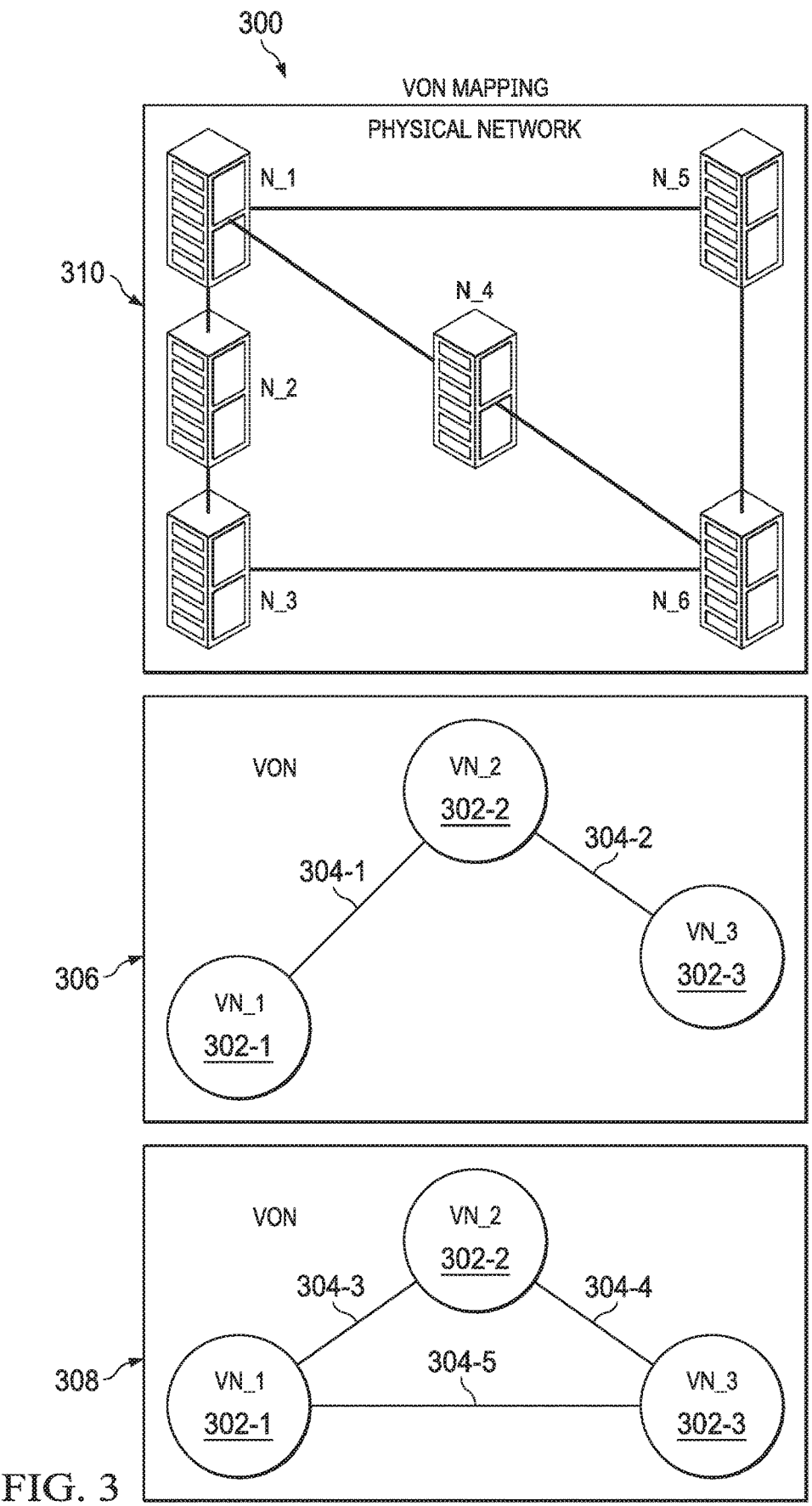
FIG. 3 is a depiction of a virtual optical network mapping to a physical network.

FIG. 3 illustrates an example of a virtual optical network (VON) mapping 300 of a VON 306 to a physical network 310. FIG. 3 is an example depicted for descriptive purposes. It will be understood that VON mappings, as disclosed herein, may be implemented for different sizes and complexities of both VONs and physical networks. In VON mapping 300, physical network 310 is shown comprising six physical nodes, N_1, N_2, N_3, N_4, N_5, and N_6. Additionally, physical network 310 includes links between individual nodes that represent an actual physical network topology. In different implementations, physical nodes in physical network 310 may represent certain network infrastructure, such as data centers or other information technology (IT) infrastructure that relies upon the physical links for communication between the physical nodes. Furthermore, physical network 310 may correspond to a particular physical area, such as a metropolis, a region, a county, a state, or other areas.

In FIG. 3, VON 306 may represent a virtual optical network that is provided to a customer as a telecommunications service. Accordingly, VON 306 may represent a combination of network products and network services provided to a customer by a network provider, such as a network provider associated with physical network 310. As shown, VON 306 comprises three virtual nodes (VN) 302, namely VN_1 302-1, VN_2 302-2, and VN_3 302-3, as well as virtual link 304-1 between VN_1 302-1 and VN_2 302-2, and virtual link 104-2 between 302-2 and VN_3 302-3.

In FIG. 3, VON 308 may represent another virtual optical network that is provided to a customer as a telecommunications service. Accordingly, VON 308 may represent a combination of network products and network services provided to a customer by a network provider, such as a network provider associated with physical network 310. As shown, VON 308 comprises three virtual nodes VN_1 302-1, VN_2 302-2, and VN_3 302-3, as well as virtual link 304-3 between VN_1 302-1 and VN_2 302-2, virtual link 304-4 between 302-2 and VN_3 302-3, and virtual link 304-5 between VN_1 302-1 and VN_3 302-3.

In order to facilitate VON mapping 300, a VON may be selected based on requested features of the telecommunication service, such as between VON 306 and VON 308. Then, each of the virtual nodes 302 in the selected VON may be mapped to one of the physical nodes in physical network 310, while virtual links 304 may represent physical links (and certain physical nodes) between the mapped physical nodes. Depending on the topologies used for VON mapping 300, virtual node 302 may be selected from one or more of the physical nodes. In other words, virtual node 302 may be associated with at least one candidate physical node for VON mapping 300.

In operation, optical transport network 101 in FIG. 1 may be used to implement physical network 310 shown in FIG. 3. Accordingly, certain nodes included with optical transport network 101 may represent physical nodes that can be mapped to virtual nodes 302 of a desired VON, such as VON 306 or 308 as shown in VON mapping 300, or any in other desired VON mapping for a customer. A customer that is provided VON mapping 300 may also be provided with a choice of different levels of network service, such as different levels of quality of service (QoS) associated with VON 306. Additional aspects of QoS may include error rates and transmission throughput rates (baud rates), which may represent additional or higher levels of network service. Conventional methods of VON mapping may assign large amounts of network resources to meet a QoS criteria, and in particular, may consume large amounts of the available optical spectrum for this purpose. However, availability of the VON may be a primary aspect that is valuable for a customer that uses VON services from a provider.

Additional performance metrics (or quality metrics) associated with a physical link, such as an optical path, may include optical signal-to-noise ratio (OSNR), electrical symbol signal-to-noise (SNR) ratio, quality factor (Q-factor or Q), pre-FEC bit error rate (BER), or post-FEC BER, and frame loss rate.

Figure 4:
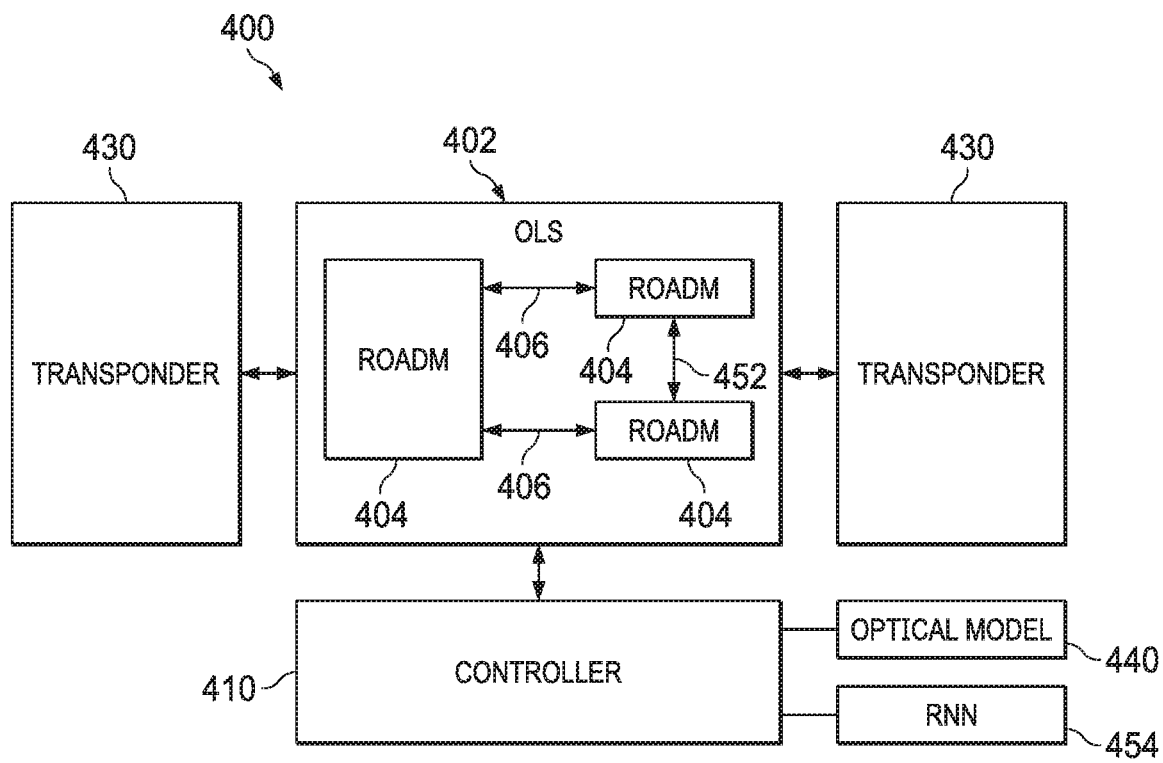
FIG. 4 is a block diagram of an optical environment.

Referring to FIG. 4, FIG. 4 illustrates an optical network environment 400. The optical network environment 400 can include an optical line system (OLS) 402 that includes reconfigurable optical add-drop multiplexers (ROADMs) 404 that are connected by optical connections 406. The optical network environment 400 can include any number of ROADMs 404. In simpler optical environments, some ROADMs may be replaced by a wavelength multiplexing device such as the multiplexer 104, a demultiplexing device such as the demultiplexer 105, or by OADMs that are not reconfigurable. The optical network environment 400 can further include an optical controller 410 in communication with the optical network environment 400. The optical controller 410 can be similar to the modeling prediction engine 232 of FIG. 2. In some examples, certain characteristics of the OLS 402 can be unknown or unreliable to an outside source, or a third-party source (such as the transponders 430 in optical communication with the OLS 402), or to an outside controller, or a third-party controller (such as the controller 410).

To that end, the optical controller 410 can obtain optical network topology information of the OLS 402. Specifically, the optical controller 410 can obtain such information of the OLS 402 as a topology of the ROADMs 404 and the optical connections 406 connecting the ROADMS 404. In some examples, the optical connections 406 can represent one or more of fiber spans, amplifiers, attenuators, etc., interconnecting a subset of the ROADMs 404. In some examples, the optical controller 410 can obtain optical information from the OLS 402 or from the transponders 430, including a topology of the ROADMs 404, fiber types of the optical connections 406, quality of transmission (QoT) measurements, and transponder routes. In some examples, the optical controller 410 can only obtain the optical information from the OLS 402 including topology of the ROADMs 404, fiber types of the optical connections 406, quality of transmission (QoT) measurements, and transponder's signal routes.

In some implementations, the optical controller 410 can generate an optical model 440 that represents the OLS 402 and any transponders 430. Specifically, the optical controller 410 generates the optical model 440 based on the optical network topology information.

In particular, the optical controller 410 can generate an optical model 440 to represent the OLS 402, consisting of optical model building blocks that model specific physical characteristics of the OLS 402 such as noise addition, cross-talk, etc. The optical model blocks can be associated with parameters that can be initialized to a particular "worst-case" value. In some examples, the optical model 440 is not a 1:1 match of each optical element of the OLS 402. That is, an optical model building block of the optical model 440 can represent multiple physical elements of the OLS 402. In some examples, the optical model 440 matches the topology of the ROADMs 404 of the OLS 402. That is, the optical signal routing options of the optical model 440 should be the same to those through the OLS 402.

In some examples, the optical controller 410 generates the optical model 440 such that the optical model 440 includes all relevant effects that determine QoT such as ASE noise from amplification, coherent and incoherent cross-talk, nonlinear noise (NLI), and filtering effects (passband narrowing (PBN)), attenuation and gain, etc.) The optical model building blocks of the optical model 440 can represent such effects. Further, the optical model 440 can include all relevant path portions in a topology (e.g., add-to-network-via-ROADM, link-between-ROADMs, express-through-ROADM, drop-from-network-via ROADM). The optical controller 410 can do such by modeling each type of optical path with a set of optical building blocks. Further, the optical model 440 can include all relevant operating conditions or set-point parameters to represent different network states (e.g., modulation format, wavelength, ROADM wavelength routing switch state, ROADM passband centers and widths, launch power set-points, amplifier gain set-points, etc.). Further, the optical model 440 can include a grouping of different types of hardware to determine over what range of hardware typical performance is estimated (e.g., transponders—vendor types; fiber—types SMF and DSF; amplifier—types Low Gain, Medium Gain, and High Gain; ROADM—types pre-2016 ROADM, post-2016 ROADM v1, and post-2016 ROADM v2). Further, the optical model 440 can include a sufficient number of model parameters (degrees of freedom) to be estimated in order to be able to sufficiently "fit" the model to measurement in optical environment 400.

In some implementations, the optical controller 410 can provision a new optical connection 452 within the OLS 402. The new optical connection 452 can be between two ROADMS 404, and include any number of intermediate ROADMs 404 and optical connections 406. In response to provisioning the new optical connection 452, the optical controller 410 can determine, using the optical model 440, a predicted bit error rate (BER) of a signal transmitted over the new optical connection 452 of the OLS 402, and a measured BER reported by a signal receiver of a transponder receiving an optical signal of the new optical connection 452. Specifically, the optical controller 410 can measure the BER of the new optical connection 452 over a time period, and determine an average BER of the new optical connection 452. In some examples, the optical controller 410 can measure the BER over the time period by counting pre-forward error correction (FEC) bit errors (before the bits are corrected by an FEC) and dividing by the total number of bits in the time period. In some examples, the time period is 15 minutes. In some implementations, the optical controller 410 can compare a predicted BER and a measured BER and make changes to a parameter associated with the optical model 440 to reduce the difference in BER.

In some implementations, the optical controller 410 can determine, using the optical model 440, a signal quality and BER of the new optical connection 452. That is, the optical controller 410, using the optical model 440, can predict a signal quality and BER along a route of the OLS 402, and specifically, the new optical connection 452. The optical controller 410 can determine the signal quality of the new optical connection 452 if a specified signal type of a specified wavelength is added to the OLS 402 at a specified add node, routed through the OLS 402 along a specified route, and dropped at specified drop node and received by a specified receiver type.

In some implementations, the optical controller 410 can determine, using the OLS 402 that provides the new optical connection 452, a signal quality and BER of the new optical connection 452. That is, the optical controller 410, using the OLS 402, can determine a signal quality and BER along a route of the OLS 402, and specifically, the new optical connection 452, under a multitude of potential configurations and operating conditions.

In some implementations, in response to provisioning the new optical connection 452, the optical controller 410 can determine, based on the predicted signal quality or BER of the new optical connection 452 using the optical model 440 and the signal quality or BER of the new optical connection 452 using the OLS 402, a BER excursion parameter of the new optical connection 452. Specifically, the optical controller 410 can identify, from the BER obtained over a time period for the new optical connection 452, a largest BER deviation within the time period from the predicted BER. In other words, the optical controller 410 can identify a worst BER deviation from a longer time period average (e.g., 15 minutes, or 24 hours) over a smaller time period average (for example the time period it takes to transmit a data frame, within each longer time period). In some implementations, the excursion parameter is based on an estimated signal-to-noise ratio (SNR) over a longer time period, and a measured SNR over a shorter time period.

In some examples, the optical controller 410 determines the BER excursion parameter of the new optical connection 452 by identifying a largest signal-to-noise ratio (SNR) deviation within a time period shorter than a transmission frame from a predicted SNR value obtained using an optical model associated with parameters that are adjusted substantially less frequently than the time period.

In some implementations, in response to provisioning the new optical connection 452, the optical controller 410 can train a margin allocator comprising a recurrent neural network (RNN) 454. Specifically, the optical controller 410 can train the margin allocator RNN 454 based on the BER excursion parameter for the new optical connection 452 and the predicted signal quality or BER of the new optical connection 452. In some examples, the margin allocator RNN 454 can be pre-trained using required margin design tools that assume a worst-case situation, and will recommend an optical margin for each specific route through the OLS 402 for a specified transmitter and receiver type, described further herein. In some examples, the optical controller 410 can train the margin allocator RNN 454 using the route information of the new optical connection 452, the measured BER excursion of the new optical connection 452, configuration information of the optical model 440, and estimated parameters of the OLS 402 by the optical model 440 to update parameters of the margin allocator RNN 454. Specifically, the margin allocator RNN 454 can obtain the predicted/estimated signal quality (QoT) or BER of the new optical connection 452 as an input. In some examples, the inputs to the margin allocator RNN 454 can include estimated parameter associated with the optical model building blocks of the optical model 440; and a state of the OLS 402 that is a collection of set-points. In some examples, the inputs to the margin allocator RNN 454 can be based on a maximization of performance of the margin allocator RNN 454. For example, if relevance of information input to the margin allocator RNN 454 is unknown, the margin allocator RNN 454 can learn over time the relevance of such information.

In some examples, the training of the margin allocator RNN 454 (e.g., the adjustment of internal parameters, or RNN "weights") using the excursion BER is controlled by an error function (cost function or loss function). The error function can penalize under-estimation of required optical margin as compared to penalizing excessive over-estimation of the required optical margin.

In some examples, the margin allocator RNN 454 can include a gated recurrent unit (GRU) or Long Short-Term Memory (LSTM); however, in some examples, the margin allocator RNN 454 can include any type of neural network.

In some implementations, the optical controller 410 can compare the predicted signal quality or BER of the new optical connection 452 using optical model 440 and a required optical margin for the new optical connection 452 to a threshold to determine a reliability of the new optical connection 452. Specifically, the optical controller 410 can configure the optical connection 452, using the margin allocator RNN 454, such that the required optical margin for the new optical connection 452 deducted from the estimated signal quality of the new optical connection 452 is greater than a threshold. Configuration of the optical connection 452 can include set-points and operating conditions, as well as a specific path or route through the network 402. In some implementations, the configuration is selected for which the optical margin allocated by RNN 454 deducted from the estimated signal quality by optical model 440 is greater than a threshold, as well as close as possible to the threshold.

In some implementations, the optical controller 410 can allocate, using the margin allocator RNN 454, the required optical margin for the additional optical connections of the OLS 402.

In some examples, the optical controller 410 can identify a signal-to-noise ratio (SNR) of at least one of the optical connections 406 (each optical connection 406 can include one or more optical connections). The optical controller 410 can determine a signal quality metric using the optical model 440 and the parameters of the optical model 440 that are based on the SNR of the optical connections 406. The optical controller 410 can replace the predicted signal quality or BER of the new optical connection 452 using the optical model 440 with the signal quality metric. In some examples, the optical controller 410 can determine the BER excursion parameter of the new optical connection 452 based on the signal quality metric over a time window that is less than a time window used to determine the signal quality or BER of the new optical connection 452 using the OLS 402. In other words, the optical controller 410 can compare a longer-term time-averaged metric (e.g., a 15-minute averaged BER, or a BER prediction based on the optical model 440 that uses a large number of 15-minute averaged BER measure periods) to a shorter-term metric (e.g., a worst SNR within a frame period, where the SNR is measured over one symbol period).

Figure 5:
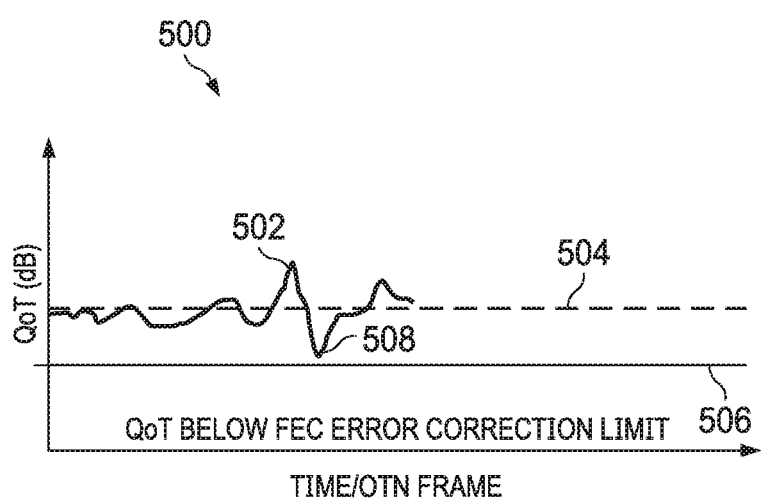
FIG. 5 is a graph depicting a signal quality of an optical connection versus time.

FIG. 5 illustrates a graph 500 illustrating signal quality (QoT) of the new optical connection 452 (in decibels) versus time (or sequential OTN frame number). Specifically, the graph 500 illustrates an actual signal quality 502 of the new optical connection 452, an expected signal quality 504, a FEC limit 506, and a worst quality of transmission (QoT) excursion 508. Specifically, the FEC limit 506 (or FEC error correction limit, or threshold) can indicate a lower boundary where signal quality below the FEC limit 506 indicates that complete error recovery is impossible. In some examples, the difference between the expected signal quality 504 and the FEC limit 506 can be greater than the required optical margin.

In some examples, the optical controller 410 can update parameters of the optical model 440 based on the new optical connection 452 and the BER of the new optical connection 452. Specifically, the optical controller 410 can update each optical model block of the optical model 440 based on a wavelength, a spectral width, and/or a power level of the new optical connection 452. That is, the optical controller 410 can make the new optical connection 452 part of the OLS 402 to account for possible interactions among the existing connections in the OLS 402, and between the new optical connection 452 and additional new connections to be added. In some examples, the optical controller 410 can update the parameters of the optical model 440 based on route information of the new optical connection 452, the measured BER of the new optical connection 452, and any available configuration information.

In some examples, the optical controller 410 can update the optical model 440 when a state of the OLS 402 is changed (e.g., when existing signals are switching differently, or operating set-points are changed, or a new signal is added). For example, the corresponding signal routes and set-point values can be updated. Further, the optical controller 402 can make adjustments to estimated parameter values of the optical model 440 based on an estimated impact of the state change on such parameters.

In some examples, the optical controller 410 can determine a reachability of the new optical connection 452 based on the signal quality of the new optical connection 452 and the optical margin of the new optical connection 452. That is, the optical controller 410 can determine, based on the signal quality and the optical margin of the new optical connection 452, how far any particular optical signal that is added to the OLS 402 can be transmitted before the information carried by the signal becomes impossible to recover error free using FEC.

In some examples, the optical controller 410 can determine a BER of the optical connection 452 of the OLS 402. The optical controller 410 can, using the optical model 440, determine a signal quality of the optical connection 452. The optical controller 410 can determine, based on the BER of the optical connection 452, a BER excursion parameter of the optical connection 452. The optical controller 410 can train the margin allocator RNN 454 based on the BER excursion parameter of the optical connection 452 and the signal quality of the optical connection 452. The optical controller 410 can update the parameters of the optical model 440 based on the BER of the optical connection 452.

In some examples, the optical controller 410 can determine a network outage rate of the optical environment 400. Specifically, when a rate of outages of environment 400 is greater than a threshold, a signal is provided to the margin allocator 410 to adjust the required optical margin such that the network outage rate stays below the threshold.

Figure 6:
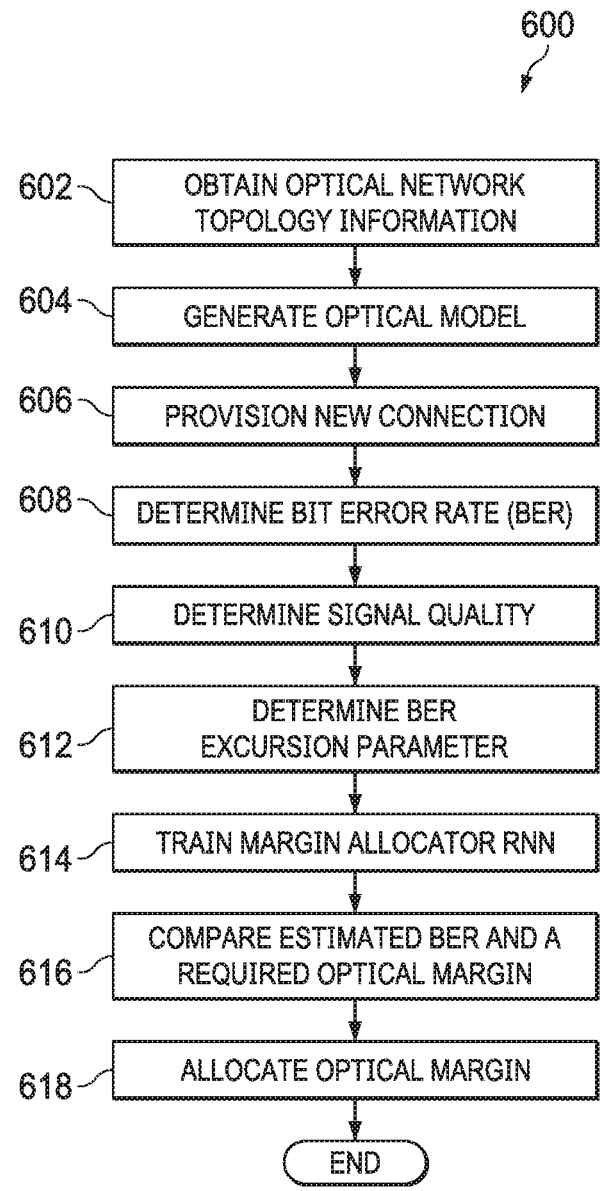
FIG. 6 is a flowchart illustrating optical margin allocation.

FIG. 6 illustrates a flowchart depicting selected elements of an embodiment of a method 600 for optical margin allocation. The method 600 may be performed by the optical network environment 400, the optical controller 410, the optical model 440, and/or the margin allocator RNN 454 described herein with reference to FIGS. 1-5. It is noted that certain operations described in method 600 may be optional or may be rearranged in different embodiments.

The optical controller 410 obtains optical network topology information of the OLS 402 (602). The optical controller 410 generates, based on the optical network topology information, the optical model 440 to represent the optical network 410 (604). The optical controller 410 provisions the new optical connection 452 within the optical network 410 (606). In response to provisioning the new optical connection, the optical controller 410 determines, using the optical model 440, an estimated bit error rate (BER) or signal quality of the new optical connection 452 of the new network 410 (608). The optical controller 410 determines, using the OLS 402, a signal quality and BER of the new optical connection 452 (610). The optical controller 410 determines, based on the estimated BER of the new optical connection 452 and the BER of the new optical connection 452, a BER excursion parameter (or signal quality excursion) of the new optical connection 452 (612). The optical controller 410 trains the margin allocator RNN 454 based on the BER excursion parameter of the new optical connection 452 and the predicted BER or signal quality of the new optical connection 452 (614). The optical controller 410 compares the estimated BER of the new optical connection 452 and a required optical margin to a threshold to determine a reliability of the new optical connection 452 (616). The optical controller 410 allocates, using the margin allocator RNN 454, the required optical margin for additional optical connections of the OLS 402 (618). Certain steps such as determining the excursion parameter may be physically executed in specific locations in optical environment 400, such as locally in the transponder.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for optical margin allocation, the method comprising:
   obtaining, by an optical controller, optical network topology information of an optical network;
   generating, based on the optical network topology information, an optical model to represent the optical network;
   provisioning, by the optical controller, a new optical connection within the optical network:
   in response to provisioning the new optical connection:
      determining, using the optical model, a first bit error rate (BER) of the new optical connection of the optical network;
      determining, using the optical network providing the new optical connection, a second BER of the new optical connection;
      determining, based on the first BER and the second BER, a BER excursion parameter of the new optical connection;
      training, by the optical controller, a margin allocator comprising a recurrent neural network (RNN) based on the BER excursion parameter of the new optical connection, and the first BER of the new optical connection;
      comparing the first BER of the new connection and a required optical margin to a threshold to determine a reliability of the new optical connection; and
      allocating, using the margin allocator, the required optical margin for additional optical connections of the optical network.

2. The method of claim 1, further comprising updating one or more parameters of the optical model based on the new optical connection and the second BER of the new optical connection.

3. The method of claim 2, wherein updating the parameters of the optical model further comprises:
   updating each optical model block of the optical model based on a wavelength, a spectral width, and a power level of the new optical connection.

4. The method of claim 1, wherein the threshold is a forward error correction (FEC) error correction limit.

5. The method of claim 1, wherein obtaining the optical network topology information of the optical network includes obtaining topology information of one or more reconfigurable optical add-drop multiplexers (ROADMs) of the optical network and optical connections between the ROADMs of the optical network.

6. The method of claim 1, further comprising:
determining a reachability of the new optical connection based on the signal quality of the new optical connection and the optical margin of the new optical connection.

7. The method of claim 1, wherein determining the BER excursion parameter of the optical connection further comprises:
identifying a largest BER deviation within a time period shorter than a time period of an averaged BER.

8. The method of claim 1, wherein determining the BER excursion parameter of the optical connection comprises:
identifying a largest SNR deviation within a time period shorter than a transmission frame from a predicted SNR value obtained using an optical model with associated parameters that are adjusted substantially less frequently than the time period.

9. The method of claim 1, further comprising:
determining a BER of an existing optical connection of the optical network;
determining, by the optical model, a signal quality of the existing optical connection;
determining, based on the BER of the existing optical connection, a BER excursion parameter of the existing optical connection; and
training the margin allocator RNN based on the BER excursion parameter of the existing connection and the signal quality of the existing connection.

10. The method of claim 9, further comprising:
updating or more parameters of the optical model based on the BER of the existing optical connection.

11. The method of claim 1, further comprising:
identifying a signal-to-noise ratio (SNR) of at least one other optical connection of the optical network;
determining a signal quality metric using the optical model and one or more parameters of the optical model that are based on the SNR of the at least one other optical connection of the optical network; and
replacing the first BER with the determined signal quality metric.

12. The method of claim 11, wherein the BER excursion parameter of the new optical connection is based on the determined signal quality metric over a time window that is substantially greater than a window used to determine the second BER.

13. A system comprising a processor having access to memory media storing operations executable by the processor to:
obtaining optical network topology information of an optical network;
generating, based on the optical network topology information, an optical model to represent the optical network;
provisioning a new optical connection within the optical network;

in response to provisioning the new optical connection:
determining, using the optical model, a first bit error rate (BER) of the new optical connection of the optical network;
determining, using the optical network providing the new optical connection, a second BER of the new optical connection;
determining, based on the first BER and the second BER, a BER excursion parameter of the new optical connection;
training a margin allocator comprising a recurrent neural network (RNN) based on the BER excursion parameter of the new optical connection, and the first BER of the new optical connection;
comparing the first BER of the new connection and a required optical margin to a threshold to determine a reliability of the new optical connection; and
allocating, using the margin allocator, the required optical margin for additional optical connections of the optical network.

14. The system of claim 13, the operations further comprising updating one or more parameters of the optical model based on the new optical connection and the second BER of the new optical connection.

15. The system of claim 14, wherein updating the parameters of the optical model further comprises:
updating each optical model block of the optical model based on a wavelength, a spectral width, and a power level of the new optical connection.

16. The system of claim 13, wherein the threshold is a forward error correction (FEC) error correction limit.

17. The system of claim 13, wherein obtaining the optical network topology information of the optical network includes obtaining topology information of one or more reconfigurable optical add-drop multiplexers (ROADMs) of the optical network and optical connections between the ROADMs of the optical network.

18. The system of claim 13, the operations further comprising:
determining a reachability of the new optical connection based on the signal quality of the new optical connection and the optical margin of the new optical connection.

19. The system of claim 13, wherein determining the BER excursion parameter of the optical connection further comprises:
identifying a largest BER deviation within a time period shorter than a time period of an averaged BER.

20. The system of claim 13, wherein determining the BER excursion parameter of the optical connection comprises:
identifying a largest SNR deviation within a time period shorter than a transmission frame from a predicted SNR value obtained using an optical model with associated parameters that are adjusted substantially less frequently than the time period.

* * * * *